United States Patent
Selvasekar et al.

(10) Patent No.: US 10,737,478 B2
(45) Date of Patent: Aug. 11, 2020

(54) MANUFACTURE OF VIBRATION DAMPING STRUCTURES

(71) Applicant: Ford Global Technologies, LLC, Dearborn, MI (US)

(72) Inventors: Siddharthan Selvasekar, Livermore, CA (US); Alexander Groh, Detroit, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 580 days.

(21) Appl. No.: 15/441,999

(22) Filed: Feb. 24, 2017

(65) Prior Publication Data

US 2018/0243997 A1    Aug. 30, 2018

(51) Int. Cl.
| | |
|---|---|
| *B33Y 10/00* | (2015.01) |
| *B29C 64/386* | (2017.01) |
| *G06F 30/17* | (2020.01) |
| *G06F 30/20* | (2020.01) |
| *G06F 30/23* | (2020.01) |
| *B33Y 30/00* | (2015.01) |
| *B33Y 50/02* | (2015.01) |
| *G06F 119/10* | (2020.01) |
| *G06F 119/18* | (2020.01) |

(52) U.S. Cl.
CPC ............ *B33Y 10/00* (2014.12); *B29C 64/386* (2017.08); *B33Y 30/00* (2014.12); *B33Y 50/02* (2014.12); *G06F 30/17* (2020.01); *G06F 30/20* (2020.01); *G06F 30/23* (2020.01); *G06F 2119/10* (2020.01); *G06F 2119/18* (2020.01)

(58) Field of Classification Search
None
See application file for complete search history.

(56) References Cited

U.S. PATENT DOCUMENTS

| | | |
|---|---|---|
| 5,543,198 A | 8/1996 | Wilson |
| 9,275,622 B2 | 3/2016 | Claeys |
| 9,378,721 B2 | 6/2016 | Zalewski |

(Continued)

FOREIGN PATENT DOCUMENTS

| | | |
|---|---|---|
| CN | 103218488 A | 7/2013 |
| CN | 105458262 A | 4/2016 |

(Continued)

OTHER PUBLICATIONS

Yang et al. "Acoustic metamaterial panels for sound attenuation in the 50/1000 HZ regime" Applied Physics Letters 96, 041906, pp. 1-3. (Year: 2010).*

(Continued)

*Primary Examiner* — Suzanne Lo
(74) *Attorney, Agent, or Firm* — David R. Stevens; Stevens Law Group

(57) ABSTRACT

A computer system generates a lattice structure effective to satisfy static loading criteria, the lattice structure including surfaces, nodes, and branches interconnecting nodes. The branches are removed and various alternative configurations are tested to identify one that meets low frequency damping requirements. An outer damping layer is selected to satisfy high frequency damping requirements and is added to the lattice structure. The lattice structure may then be fabricated using an additive manufacturing device.

16 Claims, 4 Drawing Sheets

(56) References Cited

U.S. PATENT DOCUMENTS

| | | | |
|---|---|---|---|
| 9,418,646 | B2 | 8/2016 | Daley |
| 10,303,159 | B2* | 5/2019 | Czinger et al. |
| 2017/0072638 | A1* | 3/2017 | Hayes et al. |
| 2017/0307040 | A1* | 10/2017 | Schaedler et al. |

FOREIGN PATENT DOCUMENTS

| | | |
|---|---|---|
| DE | 4235758 A1 | 4/1994 |
| WO | WO2017088134 A1 * | 6/2017 |

OTHER PUBLICATIONS

Elsallal et al. "3D Printed Material Characterization for Complex Phased Arrays and Metamaterials" Microwave Journal, Oct. 2016, 9 pages. (Year: 2016).*

Ma et al. "A purely flexible lightweight membrane-type acoustic metamaterial" J. Phys. C:Appl. Phys. 48 175105, pp. 1-7 (Year: 2015).*

Ang et al. "Acoustic Metamaterials: A Potential for Cabin Noise Control in Automobiles and Armored Vehicles" International Journal of Applied Mechanics, vol. 8, No. 5, 1650072, 35 pages. (Year: 2016).*

Abdeljabar et al. "Optimization of chiral lattice based metastructures for broadband vibration suppression using genetic algorithms", Journal of Sound and Vibration 369, 2016, pp. 50-62. (Year: 2016).*

"On topology optimization of acoustic metamaterial lattices for locally resonant bandgaps of flexural waves" [Hedayatrasa et al] Proceedings of Acoustics 21016.

3D printed lattice structure absorbs vibrations and provides support http://adserver.adtech.de/?adlink/1211/6277187/0/16/AdId=15745475;BnId=2;itime=515127164.

Additive Manufactured Function Integrated Damping Structures https://dmrc.unipaderborn.de/content/research/internalprojects/additivemanufacturedfunctionintegrateddampingstru Zimmer et al., Dec. 12, 2016.

Composite 3D printed metastructures for low frequency and broadband vibration absorption Matlak et al., Abstract only, Nov. 30, 2015.

* cited by examiner

MANUFACTURE OF VIBRATION DAMPING STRUCTURES

BACKGROUND

Field of the Invention

This invention relates to design of structures, particularly for manufacture using an additive manufacturing process.

Background of the Invention

A modern vehicle must meet very stringent safety standards. It must also compete in a crowded marketplace with other vehicles. In order to capture market share and command a high price, a vehicle must be perceived as having high performance and the latest technology. A vehicle is also judged based on fit and finish and a refined ride quality. One important aspect of a refined ride quality is the amount of road and wind noise that enters the vehicle cabin.

The system and method disclosed herein provides an improved approach for designing vehicle structures to reduce transmission of noise into the cabin.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
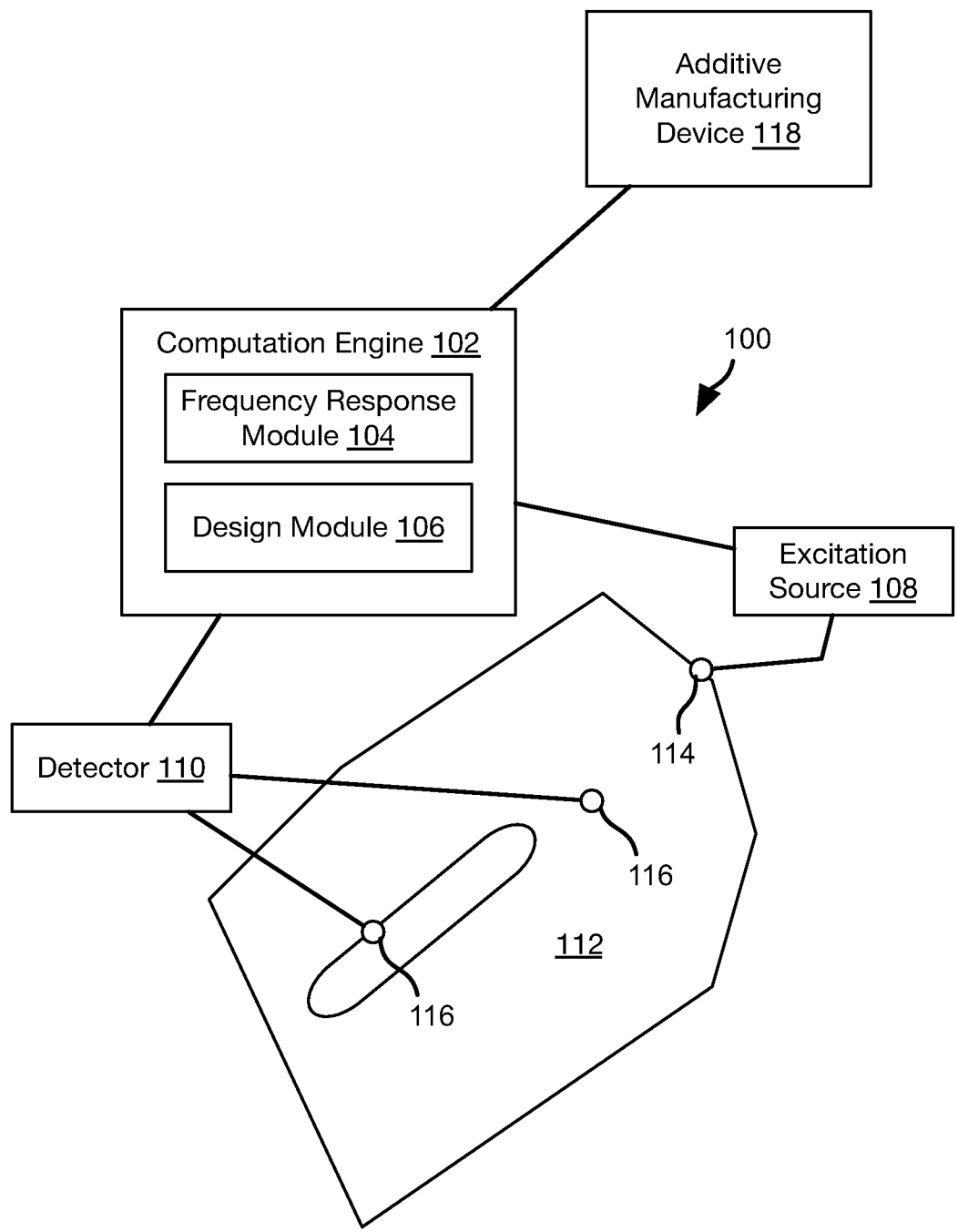
FIG. 1 is a schematic block diagram of components implementing a system in accordance with an embodiment of the present invention.

Referring to FIG. 1, the illustrated system 100 may be used to design structures of a vehicle, or other system, in order to meet both structural and vibration damping requirements. The system 100 may include a computation engine 102 including a frequency response module 104 and a design module 106. The frequency response module 104 measures or models the propagation of vibrations between an excitation source 108 and a detector 110 through a structure 112. The excitation source 108 may apply an excitation force at one or more locations 114 and vibrations may be detected at one or more other locations 116 offset from the one or more locations 114.

In the illustrated example, the structure 112 is a vehicle door and the locations 116 corresponds to points of attachment to the vehicle, such as a hinge or latch location. The locations 114 may correspond to an armrest or inward facing surface of the door.

The excitation source 108 may be a model of an excitation source that is modeled with respect to a model of the structure 112. Likewise, the detector 110 may simply be computer code that determines the amount of vibration of a given location 114 on the model of the structure 112. The modeling the propagation of vibration through the model of the structure 112 may be performed using finite element analysis (FEA) or any other computational technique known in the art.

Alternatively, the excitation source 108 may be an actual source of an impulse or vibrational excitation, such as a piezoelectric actuator. The detector 110 may also be a microphone, load cell, or piezoelectric sensor. In particular, the detector 110 may measure displacement of a portion of the structure 112, known as receptance. Components (amplifiers, oscilloscope, signal analyzer, etc.) for generating an appropriate excitation signal and for processing output of the detector 110 may be used as known in the art.

The design module 106 generates possible designs for a lattice structure forming the structure 112. Possible designs may then be modeled by the frequency response module 104 in order to determine the frequency response thereof. Alternatively, possible designs may be manufactured and actually tested using a physical excitation source 108 and detector 110.

The computation engine 102 may be coupled to an additive manufacturing device 118. A vibration damping structure 112 designed according to the methods disclosed herein may be provided to the additive manufacturing device 118, which then creates a physical instance of the structure 112. The additive manufacturing device 118 may be any additive manufacturing (e.g. three-dimensional printing) device known in the art.

Figure 2:
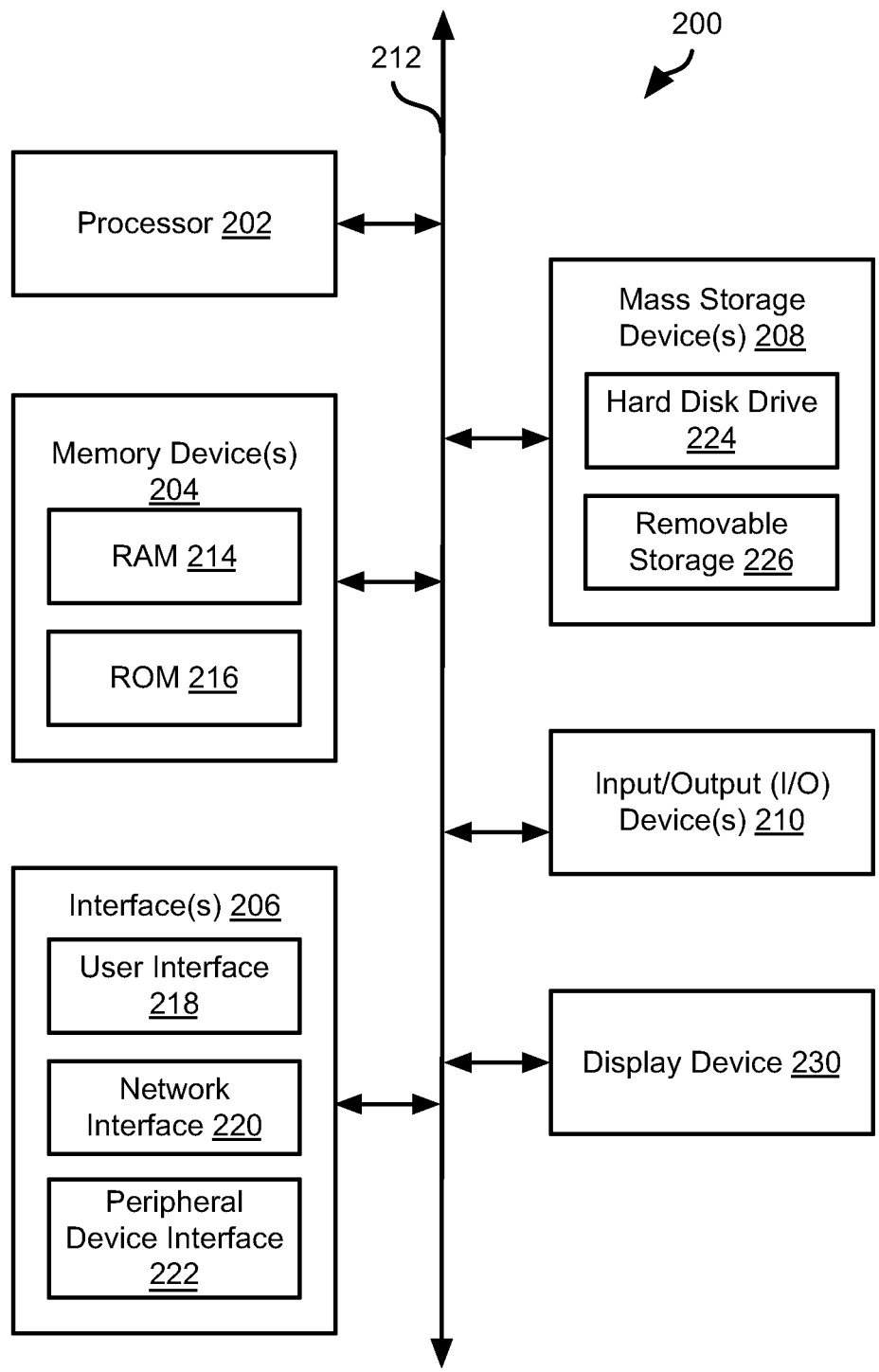
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein. The computation engine 102 may be implemented using a computing device 200.

Computing device 200 includes one or more processor(s) 202, one or more memory device(s) 204, one or more interface(s) 206, one or more mass storage device(s) 208, one or more input/output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
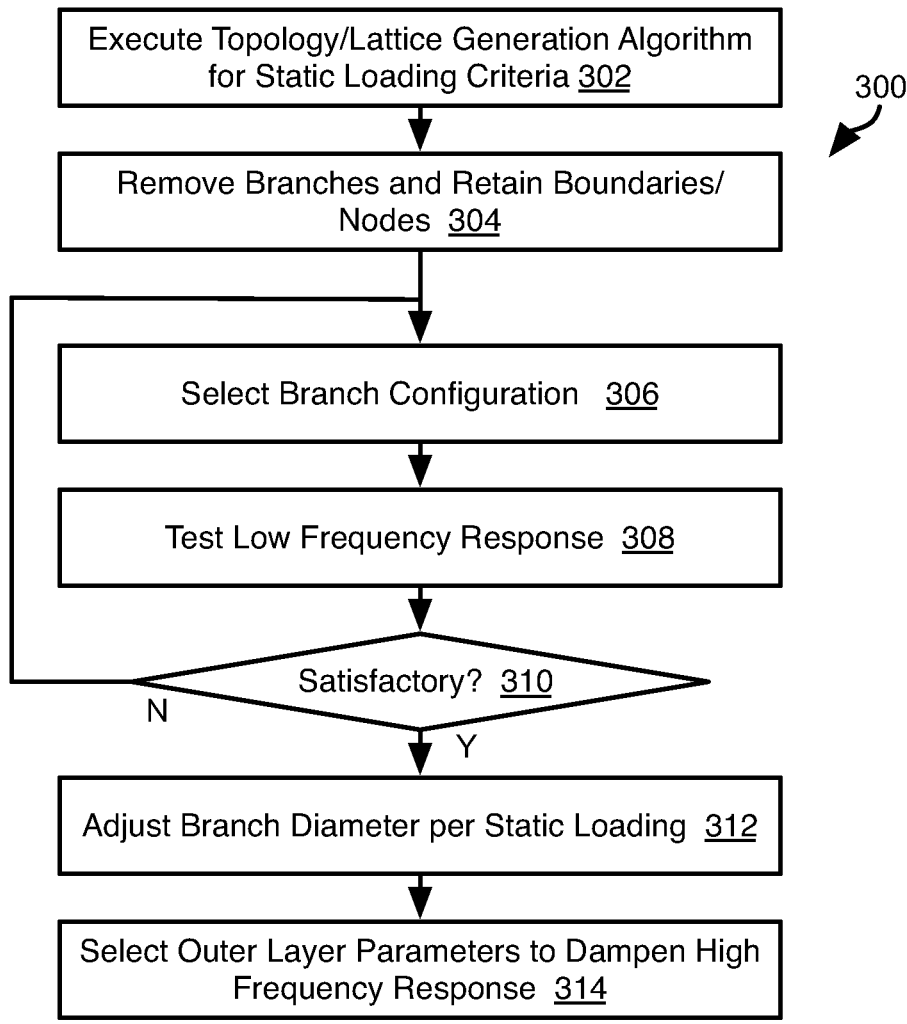
FIG. 3 is a process flow diagram of a method for designing a vibration damping structural member in accordance with embodiments of the present invention.

Referring to FIG. 3, the computation engine 102 may execute the illustrated method 300. The method 300 may include executing 302 a topology and lattice generation algorithm according to one or more static loading criteria. For example, a Voronois diagram may be used to generate the lattice. Such algorithms are known in the art and take as inputs a desired loading and output a lattice structure (hereinafter "the original lattice structure") that satisfies the static loading criteria for a given material.

For example, where the structure is a vehicle door, the static loading may include loads at points of attachment to the vehicle that are expected during opening and closing of the door and other loads to which the door may be subject. The resultant design from step 302 will be a lattice structure that is able to support the static loading. The lattice structure will include external and internal surfaces, branches extending from the surfaces, and nodes at which branches connect to one another or to the external and internal surfaces.

Figure 4A:
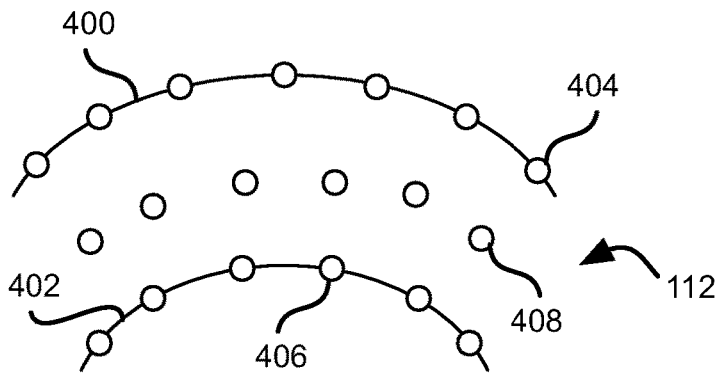
FIGS. 4A to 4D are schematic diagrams illustrating the design process of FIG. 3 in accordance with an embodiment of the present invention.

The method 300 may then include removing 304 or ignoring branches from the original lattice structure. FIG. 4A illustrates the design of the lattice structure following step 304. As is apparent, the design will include one or more surfaces, including an outer surface 400 and one or more additional surfaces 402, which may be internal or external. Nodes 404, 406 may be defined on the surfaces 400, 402. As noted above, nodes 404, 406 are the points of attachments of branches in the original lattice structure to the surfaces 400, 402. The design further includes nodes 408 that define where branches of the original lattice structure attach to two or more other branches in the original lattice structure.

The method 300 may further include selecting 306 a branch configuration (hereinafter "the candidate branch configuration"). For the nodes 404-408 of the original lattice structure, there are many alternative configurations of branches that connect to some or all of those nodes. Accordingly, step 306 may include generating a set of branches that connect to some or all of the nodes 404-408 such that each branch connects to two nodes of the nodes 404-408. The branch configurations may be selected by a "brute force" approach whereby each and every possible interconnection among nodes 404, 406, 408 is tested until a suitable design is found. The order in which branch configurations from among the possible configurations are tested may be performed using any mathematical optimization technique known in the art, such as a genetic algorithm.

Figure 4B:
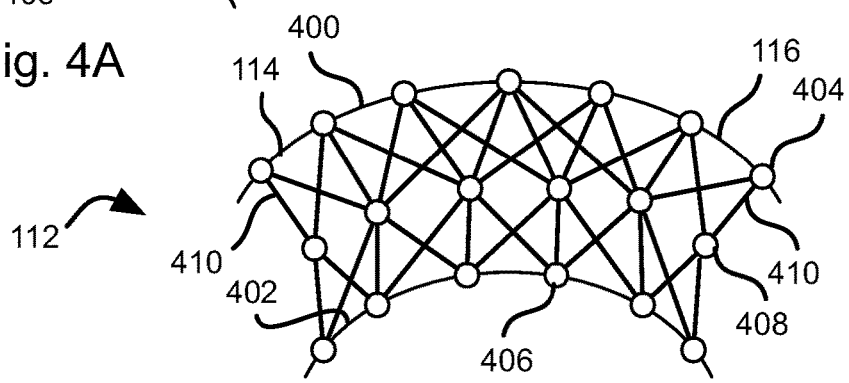

The method 300 may then include testing 308 the candidate branch configuration, i.e. the original lattice structure having the branches thereof replaced with the branch configuration selected at step 306. For example, FIG. 4B, shows the surfaces 400, 402 and nodes 404-408 of the original lattice structure having branches 410 connecting to some or all of the nodes 404-408 according to the candidate branch configuration. The structure 112 having the candidate branch configuration may then be tested by simulating input of an impulse, step input, or frequency sweep at one or more loading locations 114 and calculating a simulated receptance at the one or more detection locations 116 in response to the input.

The method 300 may include evaluating 310 whether a frequency response of the lattice structure with the candidate branch configuration meets a frequency damping criteria in a first frequency range, which may be a low frequency range. In one example, the first frequency range is from 0 to 200 Hz. The frequency damping criteria may include a frequency response within the first frequency range that is less than some threshold value, e.g. −3 dB, −10 dB, or some other threshold value. In some embodiments, the threshold may be a function of frequency such that the amount of damping required at a given frequency may be different than the required for another frequency in the first frequency range. In some embodiments, the condition of step 310 may be met by either meeting a threshold damping criteria or by the candidate branch configuration being the lowest of N candidate branch configurations tested, where N is a maximum number of configurations permitted by time, computational resources, or some other limit.

Figure 4C:
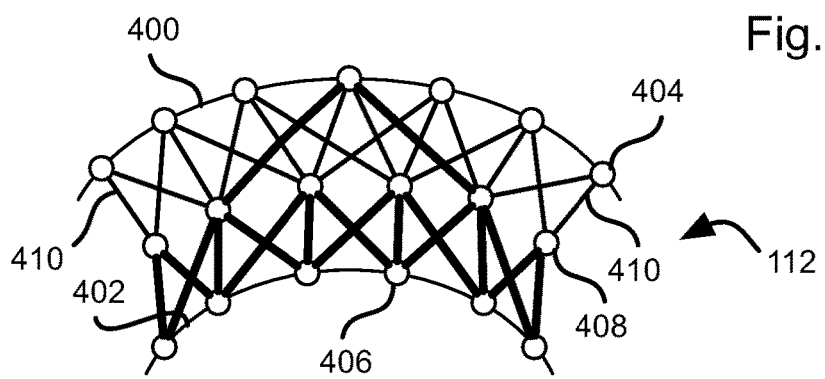

If the condition of step 310 is not met, then the process may continue at step 306 with selection of a new candidate branch configuration. If the condition of step 310 is met, then the method 300 may include adjusting 312 diameters of the branches of the candidate configuration effective to meet static loading requirements, such as the same static loading requirements used at step 302. As shown in FIG. 4C, some of the branches 410 may be strengthened, as shown by the thicker branches 410 in order to meet static loading requirements for the candidate branch configuration.

Step 312 may include an iterative process wherein failure points are identified, strengthened, and tested again, until the structure is able to bear the static loading requirements. In some embodiments, the initial diameter for the branches 410 may be set to a minimum diameter (e.g. a smallest manufacturable diameter for a given additive manufacturing device 18 or a manually set diameter). Step 312 may then include adjusting one or both of the diameter and material used for the branches to meet the static loading requirements. The branches may be uniformly cylindrical along their length or may have a cross sectional shape that varies along the length of a branch in order to meet the static loading requirements while reducing excess material.

The method 300 may include selecting 314 a design for an outer damping layer effective to dampen frequencies in a second frequency range, that may or may not overlap with the first frequency range. For example, the second frequency range may be a range of frequencies greater than 200 Hz.

Selecting 314 the outer damping layer may be performed in the same manner as selecting the branch configuration with various thicknesses and material types being modeled to determine which achieves an acceptable amount of damping across the second frequency range.

Figure 4D:
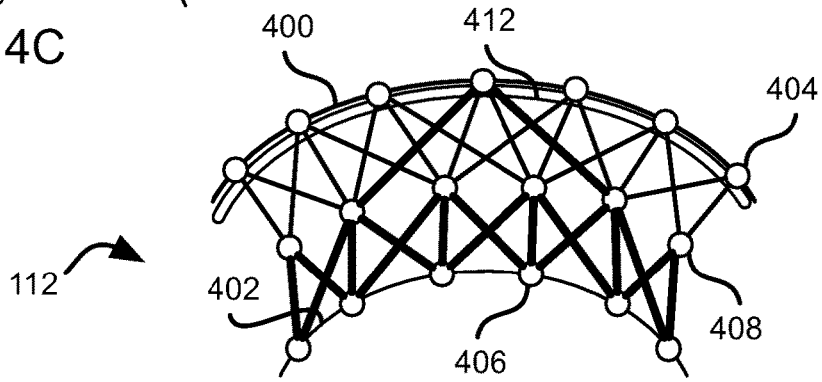

As shown in FIG. 4D, an outer damping layer 412 may be positioned over the outer layer 400 of the lattice structure. In other embodiments, the damping layer 412 is positioned under the outer layer 400, i.e. such that the outer layer 400 is the outermost layer and covers the damping layer 412 as shown in FIG. 4D.

The lattice structure including the branches 410 of the candidate branch configuration and the outer damping layer 412 may then be manufactured. This may include transmitting instructions to the additive manufacturing device 118. Some additive manufacturing devices are capable of building up structures using various materials. Accordingly, material choices for the branches 410 and outer damping layer 412 may be implemented by the additive manufacturing device 118 in order to create the lattice structure designed according to the method 300. Alternatively, the lattice structure may be generated without the outer damping layer 412, which may then be adhered to the outer surface 400 of the lattice structure by means of adhesives, welding, fasteners, or other fastening means.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising, by a computer system:
   selecting an acoustic lattice for a structure satisfying a first frequency damping criteria within a first frequency band by:
      defining a static loading for the structure;
      designing, by the computer system, a structural lattice within the structure sufficient to support the static loading, the structural lattice including one or more surfaces, a plurality of nodes, and a plurality of original branches, each original branch coupling anode of the plurality of nodes to another node of the plurality of nodes;
      generating a plurality of alternative lattices by replacing the plurality of original branches from the structural lattice with one of a plurality of alternative configurations of acoustic branches connecting the plurality of nodes;
      for each alternative lattice of the plurality of alternative lattices, simulating excitation of the each alternative lattice to determine an acoustic response of the each alternative lattice; and
      identifying the alternative lattice from among the plurality of alternative lattices meeting the first acoustic damping criteria as the acoustic lattice;
   selecting an outer layer for the structure conforming to an outer layer of the acoustic lattice, the outer layer for the structure satisfying a second frequency damping criteria within a second frequency band that is higher than the first frequency band.

2. The method of claim 1, further comprising:
   adjusting stiffness of at least a portion of the acoustic branches of the acoustic lattice effective to support the static loading using the acoustic lattice.

3. The method of claim 2, wherein adjusting stiffness of the at least the portion of the acoustic branches of the acoustic lattice comprises increasing diameters of the at least the portion of the acoustic branches.

4. The method of claim 1, wherein selecting the outer layer comprises selecting a thickness of the outer layer effective to satisfy the second frequency damping criteria within the second frequency band.

5. The method of claim 1, wherein selecting the outer layer comprises selecting a thickness and elastic modulus of the outer layer effective to satisfy the second frequency damping criteria within the second frequency band.

6. The method of claim 1, wherein the first frequency band is below 200 Hz and the second frequency band is above 200 Hz.

7. The method of claim 1, wherein the second frequency band is above 200 Hz.

8. The method of claim 1, further comprising:
   manufacturing the outer layer and the acoustic lattice using an additive manufacturing process.

9. A system comprising one or more processing devices and one or more memory devices coupled to the one or more processing devices, the one or more memory devices storing code when executed causes the one or more processing devices to:
   define an acoustic lattice for a structure satisfying a first frequency damping criteria within a first frequency band by:
      defining a static loading for the structure;
      designing, by the computer system, a structural lattice within the structure sufficient to support the static loading, the structural lattice including one or more surfaces, a plurality of nodes, and a plurality of original branches, each original branch coupling a node of the plurality of nodes to another node of the plurality of nodes;
      generating a plurality of alternative lattices by replacing the plurality of original branches from the structural lattice with one of a plurality of alternative configurations of acoustic branches connecting the plurality of nodes;
      for each alternative lattice of the plurality of alternative lattices, simulating excitation of the each alternative lattice to determine an acoustic response of the each alternative lattice; and
      identifying the alternative lattice from among the plurality of alternative lattices meeting the first acoustic damping criteria as the acoustic lattice;
   define an outer layer for the structure conforming to an outer layer of the acoustic lattice, the outer layer for the structure satisfying a second frequency damping criteria within a second frequency band that is higher than the first frequency band.

10. The system of claim 9, wherein the executable code is further effective to cause the one or more processing devices to adjust stiffness of at least a portion of the acoustic branches of the acoustic lattice effective to support the static loading using the acoustic lattice.

11. The system of claim 10, wherein the executable code is further effective to cause the one or more processing devices to adjust stiffness of the at least the portion of the acoustic branches of the acoustic lattice by increasing diameters of the at least the portion of the acoustic branches of the acoustic lattice.

12. The system of claim 9, wherein the executable code is further effective to cause the one or more processing devices to select the outer layer by selecting a thickness of the outer layer effective to satisfy the second frequency damping criteria within the second frequency band.

13. The system of claim 9, wherein the executable code is further effective to cause the one or more processing devices to select the outer layer by selecting a thickness and elastic modulus of the outer layer effective to satisfy the second frequency damping criteria within the second frequency band.

14. The system of claim 9, wherein the first frequency band is below 200 Hz and the second frequency band is above 200 Hz.

15. The system of claim 9, wherein the second frequency band is above 200 Hz.

16. The system of claim 9, further comprising an additive manufacturing device coupled to the one or more processing devices:
  manufacturing the outer layer and the acoustic lattice using an additive manufacturing process.

* * * * *

UNITED STATES PATENT AND TRADEMARK OFFICE
CERTIFICATE OF CORRECTION

PATENT NO. : 10,737,478 B2
APPLICATION NO. : 15/441999
DATED : August 11, 2020
INVENTOR(S) : Selvasekar et al.

Page 1 of 1

It is certified that error appears in the above-identified patent and that said Letters Patent is hereby corrected as shown below:

On the Title Page

Item (54) and in the Specification, Column 1, Line 1, In the Title:
"Manufacture of vibration damping structures" should be corrected to "Design And Manufacture Of Vibration Damping Structures".

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*